United States Patent
Nakazawa et al.

(10) Patent No.: US 6,493,152 B2
(45) Date of Patent: Dec. 10, 2002

(54) WIDE CONVERTER LENS

(75) Inventors: Kimiaki Nakazawa, Saitama (JP); Tomoyuki Baba, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/962,314

(22) Filed: Sep. 26, 2001

(65) Prior Publication Data

US 2002/0097502 A1 Jul. 25, 2002

(30) Foreign Application Priority Data

Sep. 28, 2000 (JP) ........................................ 2000-296886

(51) Int. Cl.$^7$ ........................... G02B 15/02; G02B 13/00
(52) U.S. Cl. ........................................ 359/673; 359/744
(58) Field of Search .................................. 359/672, 673, 359/674, 675, 744

(56) References Cited

U.S. PATENT DOCUMENTS 4,367,928 A * 1/1983 Kreitzer et al. ............. 359/744
5,214,532 A   5/1993 Hall et al.
6,449,100   *  9/2002 Nakazawa et al. .......... 359/672

FOREIGN PATENT DOCUMENTS

JP         8-43731      2/1996

* cited by examiner

*Primary Examiner*—Scott J. Sugarman
(74) *Attorney, Agent, or Firm*—Arnold International; Bruce Y. Arnold

(57) ABSTRACT

An afocal, wide converter lens is provided in order to shorten the focal length of a main lens, thereby shortening the projection distance that is needed to fully illuminate a given screen size when the wide converter lens is attached to the enlarging side of a main lens which functions as a projection lens of a projection apparatus. The wide converter lens is formed of, in sequential order in the direction from the enlarging side to the reducing side of the main lens, a lens element of positive refractive power, at least one lens element of negative refractive power, a positive meniscus lens element having its convex surface on the enlarging side, a negative meniscus lens element having its concave surface on the enlarging side, and a cemented lens of overall positive refractive power. Various conditions are satisfied in order that the wide converter lens does not degrade the optical performance of the main lens.

4 Claims, 5 Drawing Sheets

Embodiment 1

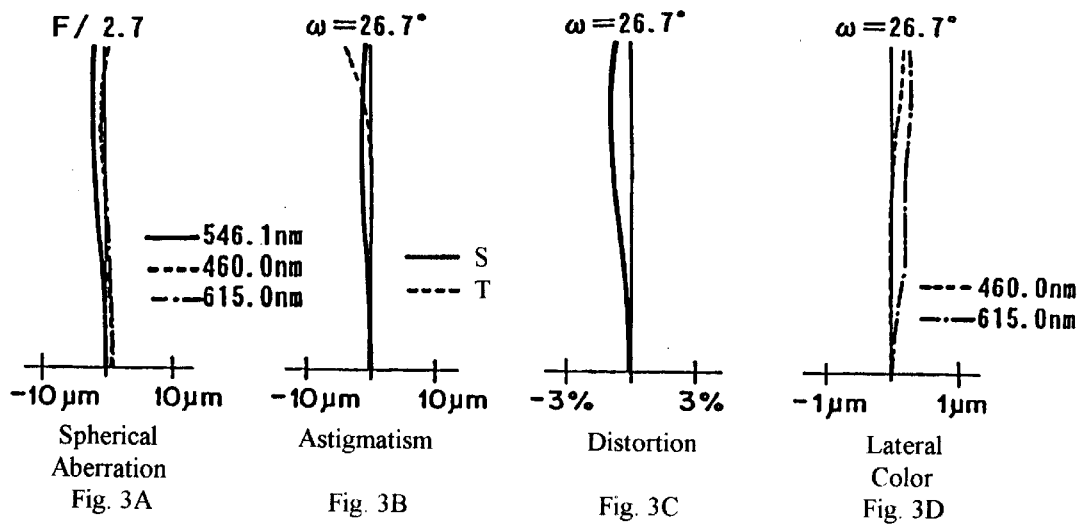
Fig. 3A Spherical Aberration
Fig. 3B Astigmatism
Fig. 3C Distortion
Fig. 3D Lateral Color
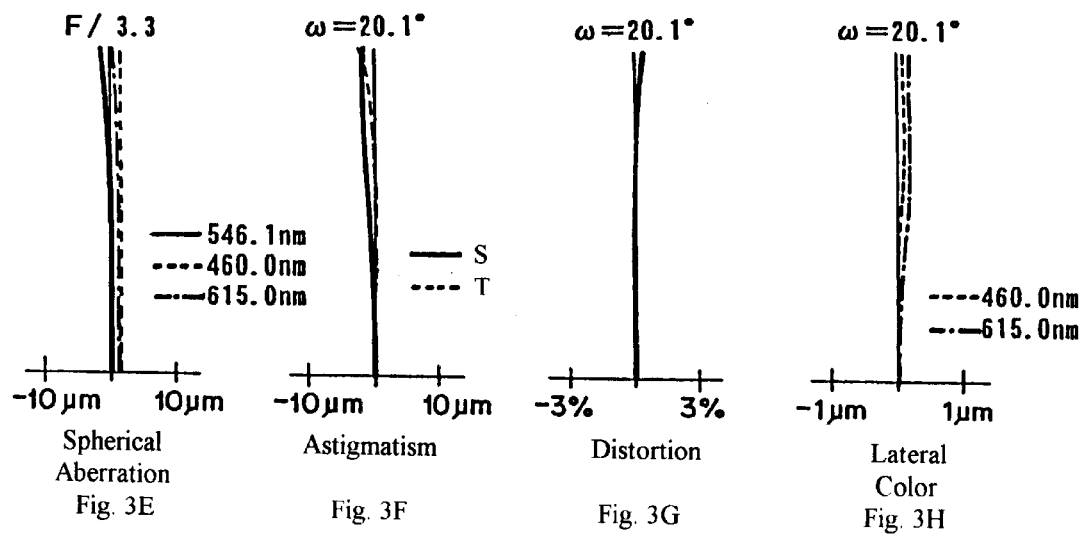
Fig. 3E Spherical Aberration
Fig. 3F Astigmatism
Fig. 3G Distortion
Fig. 3H Lateral Color

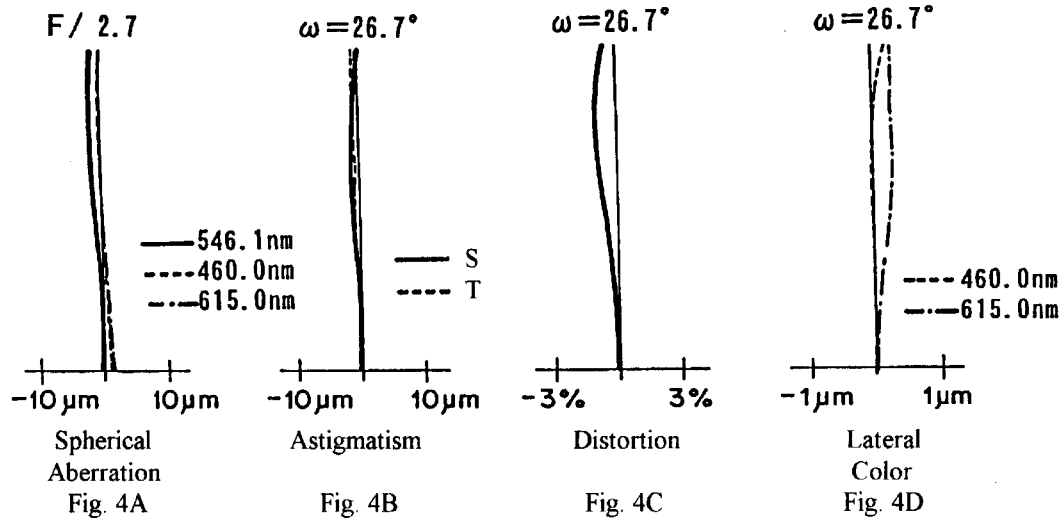
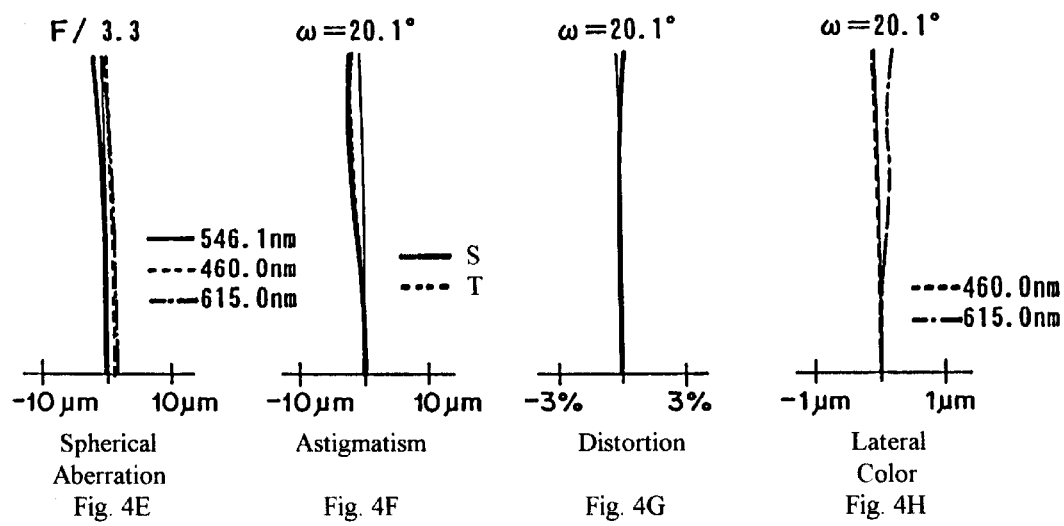

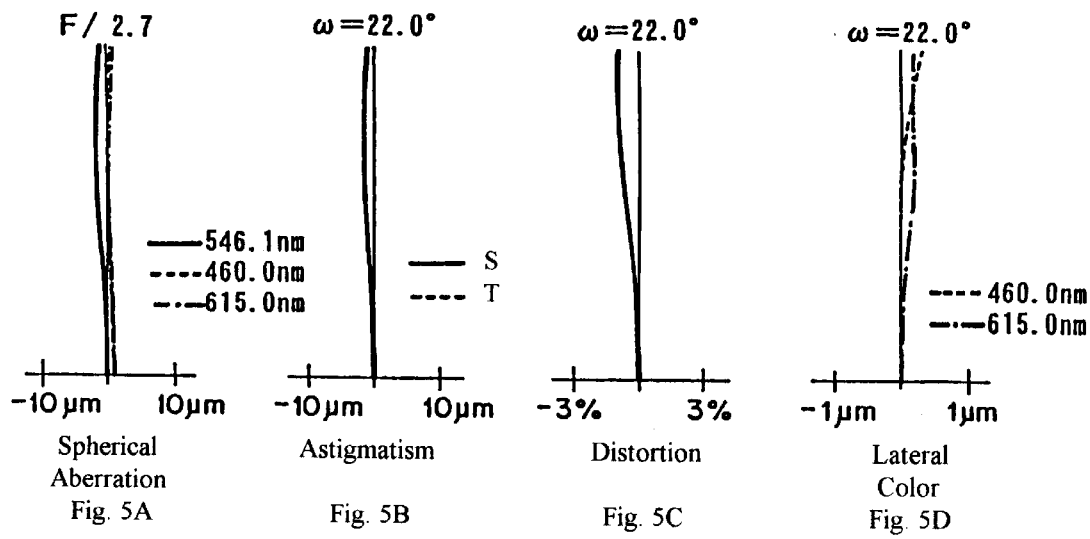
Fig. 5A  Spherical Aberration
Fig. 5B  Astigmatism
Fig. 5C  Distortion
Fig. 5D  Lateral Color
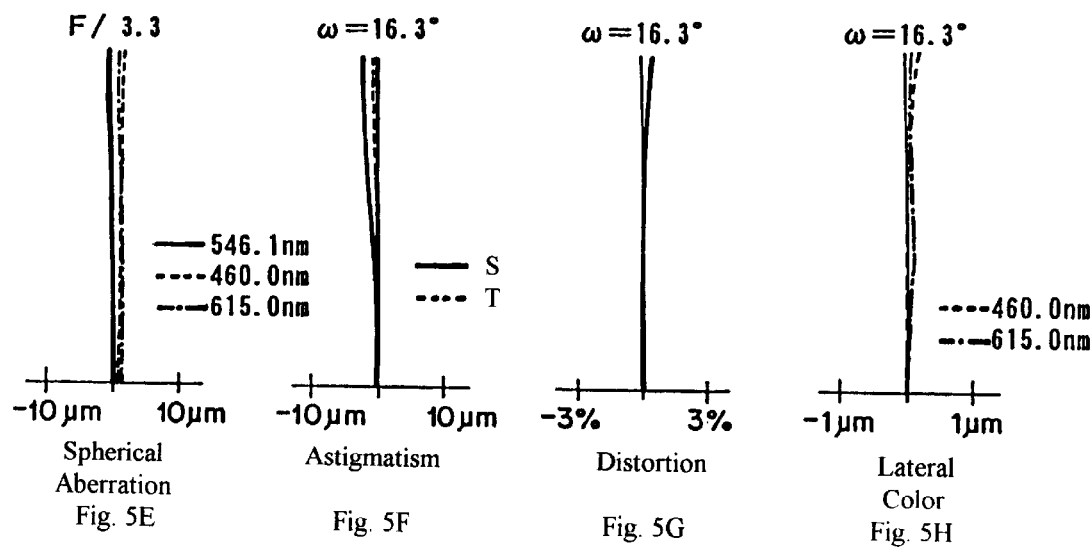
Fig. 5E  Spherical Aberration
Fig. 5F  Astigmatism
Fig. 5G  Distortion
Fig. 5H  Lateral Color

WIDE CONVERTER LENS

BACKGROUND OF THE INVENTION

Projection apparatus such as liquid crystal projectors, and so on, have been known in the prior art. In these projection apparatus, a light valve array, such as a liquid crystal panel or the like, is illuminated at its back side so that the light is modulated with image information. A projection lens then projects the light as an enlarged image onto a screen.

Projection apparatus have been used increasingly in various places as a result of recent improvements in performance, and thus a need has arisen for selecting among various projection distances when using the same screen and the same projection apparatus. For example, one projection apparatus may be purchased by a company with the purpose of using it in a large meeting room, but a need to use it in a smaller research laboratory room or some other small room can also arise. In such a case, if an attachment lens for shortening the focal length of the projection lens is added to the projection lens, the projection apparatus can conveniently be made to accommodate a smaller viewing space by decreasing the viewing distance required while maintaining the same size projected images. Such an attachment lens is herein called a wide converter lens because it converts the lens focal length to the wide-angle side. In other words, it shortens the focal length of the main lens when attached to the main lens.

A wide converter lens has been described in Japanese Laid Open Patent Application H8-43731. This lens employs four lens elements, in order from the object side, as follows: a first lens element of positive refractive power that has a meniscus shape, a second lens element of negative refractive power that has a meniscus shape, a third lens element of negative refractive power that has a meniscus shape, and a fourth lens element of positive refractive power. An air lens of positive refractive power is formed between the first lens element and the second lens element. This prior art wide converter lens is compact and is afocal. By attaching the wide converter lens to the object side of a photographing system, the field of view of the photographing system is increased by a factor of about 2.

Prior art wide converter lenses (as represented by the lens described above) were developed for attachment to a photographic camera lens for the purpose of expanding the field of view at the wide-angle end. However, sufficient aberration corrections were not made at the telescopic end for the wide converter lens to form a satisfactory image when used with a photographing lens at the telephoto end. Moreover, the prior art wide converter lenses did not have their aberrations sufficiently corrected at even the wide-angle end so as to be useful, for example, in projecting the very fine pixel elements of a liquid crystal display panel, or the like, to a screen for viewing using a projection optical system. There were problems in that the astigmatism and lateral color aberrations were not sufficiently corrected for such applications, resulting in a degradation of the images using such a wide converter lens.

BRIEF SUMMARY OF THE INVENTION

This invention relates to a wide converter lens and, more particularly, to a wide converter lens which shortens the overall focal length of an optical system to which it is attached by being mounted to the enlarging side of a projection lens of an image projection apparatus which uses a light valve array, such as a liquid crystal display panel or the like, to form images that are then projected. The object of the present invention is to provide a wide converter lens having good optical performance. The lens of the present invention is very favorably corrected for astigmatism, curvature of field, and lateral color, so that these aberrations are roughly equal to those of the main lens without the wide converter lens attached, over the full range of focal length adjustment of the main lens (i.e., from the wide-angle end to the telephoto end).

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion and lateral color, respectively, of the wide converter lens of Embodiment 1 when attached to the projection lens illustrated in FIG. 1 at the wide-angle end, wherein the f-number of the combination is 2.7 and the half-image angle $\omega$ is 26.7°.

FIGS. 3E–3H show the spherical aberration, astigmatism, distortion and lateral color, respectively, of the wide converter lens of Embodiment 1 when attached to the projection lens illustrated in FIG. 1 at the telephoto end, wherein the f-number of the combination is 3.3 and the half-image angle $\omega$ is 20.1°.

FIGS. 4A–4D show the spherical aberration, astigmatism, distortion and lateral color, respectively, of the wide converter lens of Embodiment 2 when attached to the projection lens illustrated in FIG. 2 at the wide-angle end, wherein the f-number of the combination is 2.7 and the half-image angle $\omega$ is 26.7°.

FIGS. 4E–4H show the spherical aberration, astigmatism, distortion and lateral color, respectively, of the wide converter lens of Embodiment 2 when attached to the projection lens illustrated in FIG. 2 at the telephoto end, wherein the f-number of the combination is 3.3 and the half-image angle $\omega$ is 20.1°.

FIGS. 5A–5D show the spherical aberration, astigmatism, distortion and lateral color, respectively, of the projection lens shown in FIGS. 1 and 2, by itself at the wide-angle end, wherein the f-number of the projection lens is 2.7 and the half-image angle $\omega$ is 22.0°.

FIGS. 5E–5H show the spherical aberration, astigmatism, distortion and lateral color, respectively, of the projection lens shown in FIGS. 1 and 2, by itself at the telephoto end, wherein the f-number of the projection lens is 3.3 and the half-image angle $\omega$ is 16.3°.

DETAILED DESCRIPTION

The wide converter lens of the present invention is afocal and is mounted on the enlarging side (i.e., the large conjugate side) of a main lens in order to shorten the focal length of the combination of the wide converter lens and main lens as a whole. The wide converter lens of the present invention is formed of, in order from the enlarging side of the combination, a positive lens element, at least one negative lens element, a positive meniscus lens element with its convex surface on the enlarging side, a negative meniscus lens element with its concave surface on the enlarging side, and a cemented lens of overall positive refractive power formed of a positive lens element that is cemented to a negative lens element.

Moreover, the following Conditions (1) and (2) are satisfied:

$N_n > 1.65$          Condition (1)

$\nu_n > 35.0$          Condition (2)

where $N_n$ is the average of the indexes of refraction of all the negative lens elements of the wide converter lens, and $\nu_n$ is the average of the Abbe numbers of all the negative lens elements of the wide converter lens.

Furthermore, it is preferred that the below Condition (3) is satisfied:

$|N_{2p} - N_{2n}| > 0.2$        Condition (3)

where $N_{2p}$ is the index of refraction of the positive lens element of the cemented lens, and $N_{2n}$ is the index of refraction of the negative lens element of the cemented lens.

The above Conditions (1) and (3) are for correcting the astigmatism and curvature of field. If the above Conditions (1) and (3) are not satisfied, the astigmatism and curvature of field will be insufficiently corrected.

The above Condition (2) is for correcting the lateral color. If Condition (2) is not satisfied, the lateral color will be insufficiently corrected.

Various embodiments of the invention will now be discussed in detail with reference to the drawings.

Embodiment 1

Figure 1:
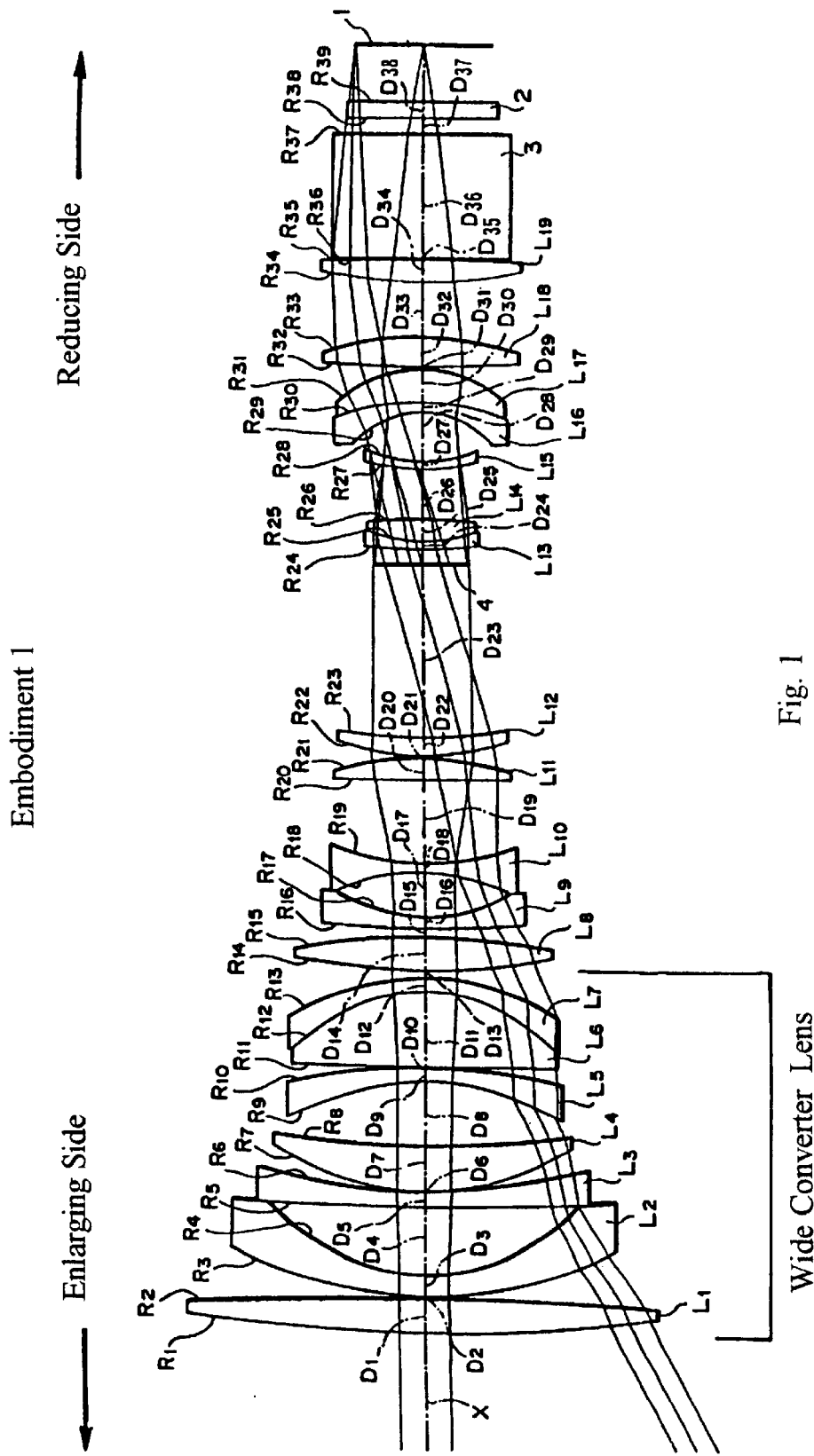
FIG. 1 shows the basic lens element configuration of the wide converter lens of Embodiment 1 of the present invention when attached to a projection lens of an image projection optical system.

As shown in FIG. 1, the wide converter lens of Embodiment 1 is mounted on the enlarging side of a projection lens of a liquid crystal projector, and functions to make the projected image larger (for a given projection distance) by reducing the focal length of the system as a whole.

The wide converter lens of this embodiment is formed of, in order from the enlarging side, a first lens element $L_1$ that is biconvex, a second lens element $L_2$ of negative refractive power that has a meniscus shape with its concave surface on the reducing side, a third lens element $L_3$ of negative refractive power that has a meniscus shape with its concave surface on the reducing side, a fourth lens element $L_4$ of positive refractive power and a meniscus shape with its convex surface on the enlarging side, a fifth lens element $L_5$ of negative refractive power and a meniscus shape with its concave surface on the enlarging side, a sixth lens element $L_6$ of positive refractive power and a meniscus shape with its convex surface on the reducing side, and a seventh lens element $L_7$ of negative refractive power and a meniscus shape with its concave surface on the enlarging side. The adjacent surfaces of the sixth lens element $L_6$ and the seventh lens element $L_7$ have the same radius of curvature and are joined so as to form a cemented lens, and this cemented lens has a positive refractive power.

In the wide converter lens of Embodiment 1, the above Conditions (1)–(3) are satisfied; therefore astigmatism, lateral color, and curvature of field are favorably corrected in this embodiment. The projection lens to which the wide converter lens is attached is a zoom lens having 12 lens elements $L_8$–$L_{19}$ as illustrated. A diaphragm 4 is located between the twelfth lens element $L_{12}$ and the thirteenth lens element $L_{13}$, and a color synthesis optical system 3, a filter 2 and a transmission-type liquid crystal display panel 1 are positioned on the reducing side of the projection lens. A light beam is transmitted through the liquid crystal display panel 1, where it is modulated with image information, is passed through the filter 2 and color synthesis optical system 3, and is then incident into the projection lens. The projection lens projects the light, via the wide converter lens, as an enlarged image onto a screen (not illustrated) that is located leftward along the optical axis X.

Table 1 below lists the surface number #, in order from the enlarging side, the radius of curvature R (in mm) of each surface, the on-axis surface spacing D (in mm), as well as the index of refraction $N_e$ and the Abbe number $\nu_e$ (both at the e-line) of each optical element of the wide converter lens of Embodiment 1 and of the main lens to which it is attached. In the bottom portion of the table are listed the focal length f, the f-number Fno, and the image angle $2\omega$ of the combined wide converter lens/projection lens at the wide-angle end and at the telephoto end.

TABLE 1

| # | R | D | $N_e$ | $\nu_e$ |
|---|---|---|---|---|
| 1 | 10.002 | 0.193 | 1.72794 | 37.7 |
| 2 | −25.544 | 0.006 | | |
| 3 | 2.475 | 0.119 | 1.80811 | 46.3 |
| 4 | 1.210 | 0.395 | | |
| 5 | 13.520 | 0.091 | 1.80811 | 46.3 |
| 6 | 3.628 | 0.006 | | |
| 7 | 1.578 | 0.256 | 1.70442 | 29.9 |
| 8 | 5.321 | 0.381 | | |
| 9 | −1.578 | 0.087 | 1.83932 | 36.9 |
| 10 | −3.772 | 0.006 | | |
| 11 | −75.588 | 0.429 | 1.51825 | 63.9 |
| 12 | −1.012 | 0.094 | 1.81078 | 40.7 |
| 13 | −1.371 | 0.031 | | |
| 14 | 3.881 | 0.203 | 1.51872 | 64.0 |
| 15 | −3.881 | 0.046 | | |
| 16 | 6.608 | 0.062 | 1.51872 | 64.0 |
| 17 | 0.960 | 0.256 | | |
| 18 | −1.249 | 0.053 | 1.51872 | 64.0 |
| 19 | 1.538 | D19 (variable) | | |
| 20 | ∞ | 0.138 | 1.77621 | 49.3 |
| 21 | −1.791 | 0.006 | | |
| 22 | 1.514 | 0.103 | 1.70557 | 41.0 |
| 23 | 2.633 | D23 (variable) | | |
| 24 | 3.952 | 0.041 | 1.69417 | 30.8 |
| 25 | 0.928 | 0.127 | 1.77621 | 49.3 |
| 26 | −3.463 | D26 (variable) | | |
| 27 | 1.295 | 0.044 | 1.81264 | 25.2 |
| 28 | 0.863 | D28 (variable) | | |
| 29 | −0.535 | 0.059 | 1.85504 | 23.6 |
| 30 | −1.359 | 0.197 | 1.71615 | 53.6 |
| 31 | −0.705 | 0.006 | | |
| 32 | 9.248 | 0.177 | 1.71615 | 53.6 |
| 33 | −1.753 | 0.314 | | |
| 34 | 2.803 | 0.132 | 1.81264 | 25.2 |
| 35 | −22.951 | 0.000 | | |
| 36 | ∞ | 0.719 | 1.51825 | 63.8 |
| 37 | ∞ | 0.084 | | |
| 38 | ∞ | 0.094 | 1.51825 | 63.8 |
| 39 | ∞ | | | | f = 0.8–1.1 mm   Fno = 2.7–3.3   $2\omega$ = 53.4°–40.2°

Table 2 below lists the values of the lens group spacings (i.e., the variable spacings listed above) for this embodiment, at the wide-angle end WIDE and at the telephoto end TELE.

TABLE 2

| Group Spacings: | D19 | D23 | D26 | D28 |
|---|---|---|---|---|
| WIDE | 0.491 | 1.140 | 0.292 | 0.277 |
| TELE | 0.249 | 0.755 | 0.726 | 0.470 |

FIGS. 3A–3D show, for Embodiment 1, the spherical aberration, astigmatism, distortion, and lateral color, respectively, for the combined wide converter lens/projection lens at the wide-angle end, and FIGS. 3E–3H show the spherical aberration, astigmatism, distortion, and lateral color, respectively, for the combined wide converter lens/projection lens at the telephoto end. In the curves for spherical aberration, aberrations are shown for wavelengths of 546.1 nm, 460.0 nm and 615.0 nm. In the curves for astigmatism, aberrations for the sagittal image surface S and the tangential image surface T are shown. In the curves for lateral color, aberrations for wavelengths of 460.0 nm and 615.0 nm are shown. Moreover, ω represents the half-image angle in these aberration charts. As is clear from these figures, all of these aberrations are favorably corrected for this embodiment.

Embodiment 2

Figure 2:
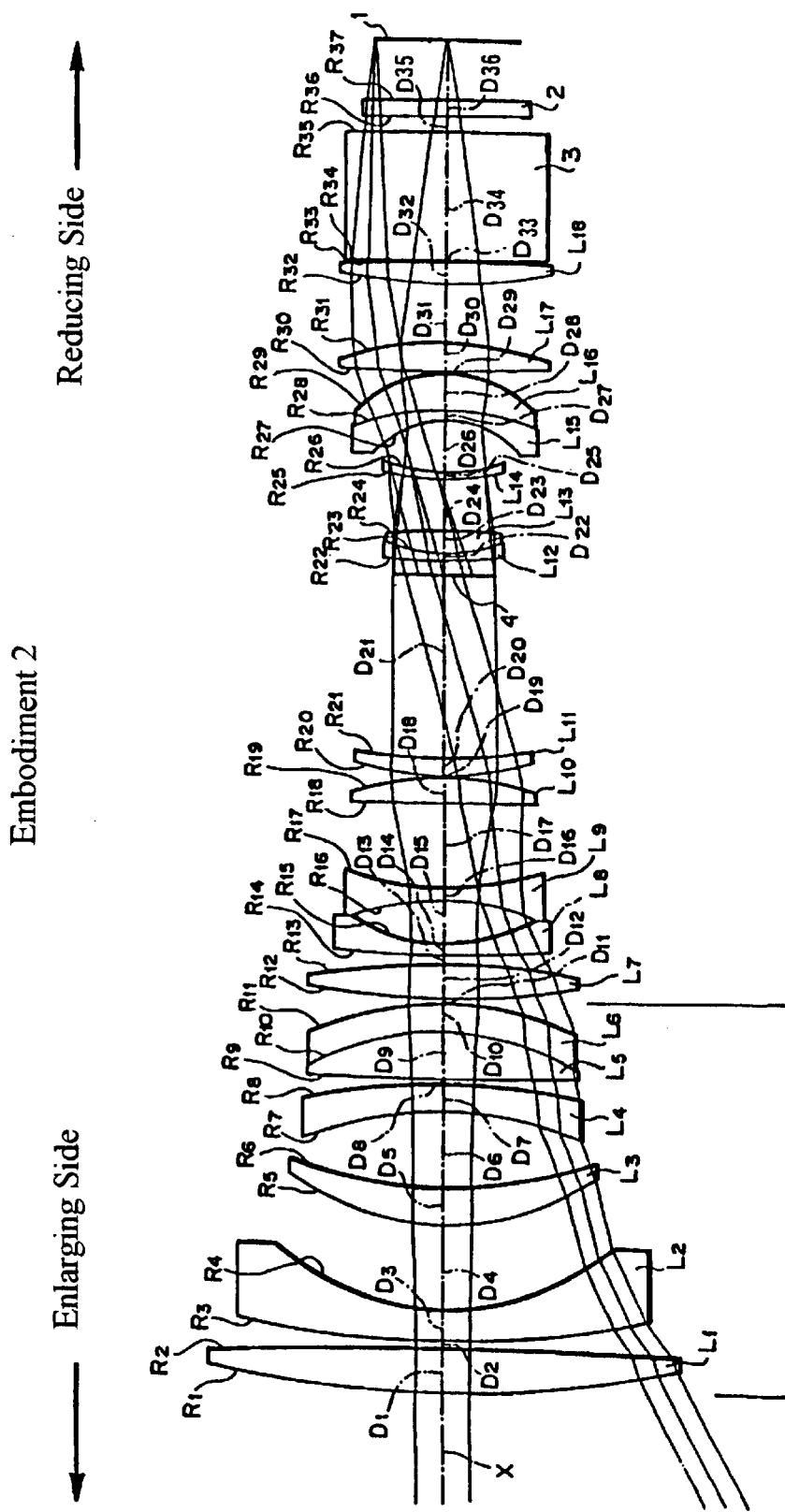
FIG. 2 shows the basic lens element configuration of the wide converter lens of Embodiment 2 of the present invention when attached to a projection lens of an image projection optical system.

As shown in FIG. 2, the wide converter lens of Embodiment 2 is also mounted on the enlarging side of a projection lens of a liquid crystal projector, and functions to make the projected image larger (for a given projection distance) by reducing the focal length of the system as a whole.

The wide converter lens of this embodiment is formed of, in order from the enlarging side, a first lens element $L_1$ of positive refractive power, a second lens element $L_2$ of negative refractive power and a meniscus shape with its concave surface on the reducing side, a third lens element $L_3$ of positive refractive power and a meniscus shape with its convex surface on the enlarging side, a fourth lens element $L_4$ of negative refractive power and a meniscus shape with its concave surface on the enlarging side, a biconvex fifth lens element $L_5$, a sixth lens element $L_6$ of negative refractive power and a meniscus shape with its concave surface on the enlarging side. The adjacent surfaces of the fifth lens element $L_5$ and the sixth lens element $L_6$ have the same radius of curvature and are joined so as to form a cemented lens of positive refractive power.

In the wide converter lens of Embodiment 2, the above Conditions (1)–(3) are satisfied; therefore astigmatism, lateral color, and curvature of field are favorably corrected in this embodiment. The projection lens to which the wide converter lens of this embodiment is attached is identical to the projection lens described above to which the wide converter lens of Embodiment 1 is attached. In this embodiment, a diaphragm 4 is located between the eleventh lens element $L_{11}$ and the twelfth lens element $L_{12}$, and a color synthesis optical system 3, a filter 2 and a transmission-type liquid crystal display panel 1 are positioned on the reducing side of the projection lens. A light beam is transmitted through the liquid crystal display panel 1, where it is modulated with image information, is passed through the filter 2 and color synthesis optical system 3, and is then incident into the projection lens. The projection lens projects the light, via the wide converter lens, as an enlarged image onto a screen (not illustrated) that is located leftward along the optical axis X.

Table 3 below lists the surface number #, in order from the enlarging side, the radius of curvature R (in mm) of each surface, the on-axis surface spacing D (in mm), as well as the index of refraction $N_e$ and the Abbe number $v_e$ (both at the e-line) of each optical element of the wide converter lens of Embodiment 2 and of the main lens to which it is attached. In the bottom portion of the table are listed the focal length f, the f-number Fno, and the image angle 2ω of the combined wide converter lens/main lens at the wide-angle end and at the telephoto end.

TABLE 3

| # | R | D | $N_e$ | $v_e$ |
|---|---|---|---|---|
| 1 | 6.449 | 0.235 | 1.72794 | 37.7 |
| 2 | −34.943 | 0.041 | | |
| 3 | 5.923 | 0.167 | 1.80811 | 46.3 |
| 4 | 1.395 | 0.468 | | |
| 5 | 1.469 | 0.203 | 1.70442 | 29.9 |
| 6 | 2.380 | 0.423 | | |
| 7 | −2.023 | 0.156 | 1.83932 | 36.9 |
| 8 | −4.096 | 0.031 | | |
| 9 | 41.689 | 0.267 | 1.51825 | 63.9 |
| 10 | −1.348 | 0.157 | 1.81087 | 40.7 |
| 11 | −1.867 | 0.031 | | |
| 12 | 3.881 | 0.203 | 1.51872 | 64.0 |
| 13 | −3.881 | 0.046 | | |
| 14 | 6.608 | 0.062 | 1.51872 | 64.0 |
| 15 | 0.960 | 0.256 | | |
| 16 | −1.249 | 0.053 | 1.51872 | 64.0 |
| 17 | 1.538 | D17 (variable) | | |
| 18 | ∞ | 0.138 | 1.77621 | 49.3 |
| 19 | −1.791 | 0.006 | | |
| 20 | 1.514 | 0.103 | 1.70557 | 41.0 |
| 21 | 2.633 | D21 (variable) | | |
| 22 | 3.952 | 0.041 | 1.69417 | 30.8 |
| 23 | 0.928 | 0.127 | 1.77621 | 49.3 |
| 24 | −3.463 | D24 (variable) | | |
| 25 | 1.295 | 0.044 | 1.81264 | 25.2 |
| 26 | 0.863 | D26 (variable) | | |
| 27 | −0.535 | 0.059 | 1.85504 | 23.6 |
| 28 | −1.359 | 0.197 | 1.71615 | 53.6 |
| 29 | −0.705 | 0.006 | | |
| 30 | 9.248 | 0.177 | 1.71615 | 53.6 |
| 31 | −1.753 | 0.314 | | |
| 32 | 2.803 | 0.132 | 1.81264 | 25.2 |
| 33 | −22.951 | 0.000 | | |
| 34 | ∞ | 0.719 | 1.51825 | 63.8 |
| 35 | ∞ | 0.084 | | |
| 36 | ∞ | 0.094 | 1.51825 | 63.8 |
| 37 | ∞ | | | |
| f = 0.8–1.1 mm | | Fno = 2.7–3.3 | 2ω = 53.4°–40.2° | |

Table 4 below lists the values of the lens group spacings (i.e., the variable spacings listed above) for this embodiment, at the wide-angle end WIDE and at the telephoto end TELE.

TABLE 4

| Group Spacings: | D17 | D21 | D24 | D26 |
|---|---|---|---|---|
| WIDE | 0.491 | 1.140 | 0.292 | 0.277 |
| TELE | 0.249 | 0.755 | 0.726 | 0.470 |

FIGS. 4A–4D show, for Embodiment 2, the spherical aberration, astigmatism, distortion, and lateral color, respectively, for the combined wide converter lens/main lens at the wide-angle end, and FIGS. 4E–4H show the spherical aberration, astigmatism, distortion, and lateral color, respectively, for the combined wide converter lens/main lens at the telephoto end. In the curves for spherical aberration, aberrations are shown wavelengths of 546.1 nm, 460.0 nm and 615.0 nm. In the curves for astigmatism, aberrations for the sagittal image surface S and the tangential image surface T are shown. In the curves for lateral color, aberrations for wavelengths of 460.0 nm and 615.0 nm are shown. Moreover, ω represents the half image angle in these aberration charts. As is clear from these figures, all of these aberrations are favorably corrected for this embodiment.

Case of the Main Lens without the Wide Converter Lens

Table 5 below lists the surface number #, in order from the enlarging side, the radius of curvature R (in mm) of each surface, the on-axis surface spacing D (in mm), as well as the index of refraction $N_e$ and the Abbe number $v_e$ (both at the e-line) of each of the optical elements of the main lens to which the converter lens may be attached. In the above embodiments, the main lens is a projection lens, and the data below is identical for the main lens and associated components used with Embodiments 1 and 2 above. Thus, the numerical values of Table 5 agree with the numerical values for the surfaces #14–39 in Table 1 and the numerical values for the surfaces #12–37 in Table 3. In the case of the main lens alone, however, as shown in the lower part of Table 5, the values of the focal length, and image angle 2ω are different from those of the above embodiments.

TABLE 5

| # | R | D | $N_e$ | $v_e$ |
|---|---|---|---|---|
| 1 | 3.881 | 0.203 | 1.51872 | 64.0 |
| 2 | −3.881 | 0.046 | | |
| 3 | 6.608 | 0.062 | 1.51872 | 64.0 |
| 4 | 0.960 | 0.256 | | |
| 5 | −1.249 | 0.053 | 1.51872 | 64.0 |
| 6 | 1.538 | D6 (variable) | | |
| 7 | ∞ | 0.138 | 1.77621 | 49.3 |
| 8 | −1.791 | 0.006 | | |
| 9 | 1.514 | 0.103 | 1.70557 | 41.0 |
| 10 | 2.633 | D10 (variable) | | |
| 11 | 3.952 | 0.041 | 1.69417 | 30.8 |
| 12 | 0.928 | 0.127 | 1.77621 | 49.3 |
| 13 | −3.463 | D13 (variable) | | |
| 14 | 1.295 | 0.044 | 1.81264 | 25.2 |
| 15 | 0.863 | D15 (variable) | | |
| 16 | −0.535 | 0.059 | 1.85504 | 23.6 |
| 17 | −1.359 | 0.197 | 1.71615 | 53.6 |
| 18 | −0.705 | 0.006 | | |
| 19 | 9.248 | 0.177 | 1.71615 | 53.6 |
| 20 | −1.753 | 0.314 | | |
| 21 | 2.803 | 0.132 | 1.81264 | 25.2 |
| 22 | −22.951 | 0.000 | | |
| 23 | ∞ | 0.719 | 1.51825 | 63.8 |
| 24 | ∞ | 0.084 | | |
| 25 | ∞ | 0.094 | 1.51825 | 63.8 |
| 26 | ∞ | | | |
| f = 1.0–1.37 mm | Fno = 2.7–3.3 | 2ω = 44.0°–32.6° | | |

Table 6 below lists the values of the lens group spacings (i.e., the variable spacings listed above) for this embodiment, at the wide-angle end WIDE and at the telephoto end TELE.

TABLE 6

| Group Spacings: | D6 | D10 | D13 | D15 |
|---|---|---|---|---|
| WIDE | 0.491 | 1.140 | 0.292 | 0.277 |
| TELE | 0.249 | 0.755 | 0.726 | 0.470 |

FIGS. 5A–5D show, for the case of the main lens without the wide converter lens attached, the spherical aberration, astigmatism, distortion, and lateral color, respectively, at the wide-angle end, and FIGS. 5E–5H show the spherical aberration, astigmatism, distortion, and lateral color, respectively, at the telephoto end. In the curves for spherical aberration, aberrations are shown for wavelengths of 546.1 nm, 460.0 nm and 615.0 nm. In the curves for astigmatism, aberrations for the sagittal image surface S and the tangential image surface T are shown. In the curves for lateral color, aberrations for wavelengths of 460.0 nm and 615.0 nm are shown. Moreover, ω represents the half-image angle in these aberration charts. As is evident by comparing FIGS. 3A–3H with FIGS. 5A–5H, and by comparing FIGS. 4A–4H with FIGS. 5A–5H, the various aberrations remain essentially the same and thus are not increased in either Embodiment 1 or 2 when the wide converter lens is attached to the main lens.

The invention being thus described, it will be obvious that the same may be varied in many ways. For example, the main lens of the present invention is not restricted to the projection lens given in the above embodiments. Also, the radius of curvature R and the spacings D may be readily scaled to achieve a desired focal length. Further, although a transmission-type liquid crystal display panel is used in the above embodiments to modulate the light with image information, other modulating means, such as a reflection-type liquid crystal display panel, DMD arrays, and so on, may be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A wide converter lens for mounting on the enlarging side of a main lens, said wide converter lens being afocal and serving to shorten the focal length of the main lens, said wide converter lens comprising, in sequential order in the direction from the enlarging side to the reducing side of the main lens:

a lens element of positive refractive power;

at least one lens element of negative refractive power;

a positive meniscus lens element having its convex surface on the enlarging side;

a negative meniscus lens element having its concave surface on the enlarging side, and a cemented lens of overall positive refractive power, said cemented lens being formed of a positive lens element and a negative lens element, in that order.

2. The wide converter lens of claim 1, wherein the following Conditions (1) and (2) are satisfied:

$N_n > 1.65$      Condition (1)

$v_n > 35.0$      Condition (2)

where $N_n$ is the average of the indexes of refraction of all the negative lens elements of the wide converter lens; and $v_n$ is the average of the Abbe numbers of all the negative lens elements of the wide converter lens.

3. The wide converter lens of claim 1, wherein the following Condition (3) is satisfied:

$|N_{2p} - N_{2n}| > 0.2$      Condition (3)

where $N_{2p}$ is the index of refraction of the positive lens element of the cemented lens, and $N_{2n}$ is the index of refraction of the negative lens element of the cemented lens.

4. The wide converter lens of claim 2, wherein the following Condition (3) is satisfied:

$|N_{2p} - N_{2n}| > 0.2$      Condition (3)

where $N_{2p}$ is the index of refraction of the positive lens element of the cemented lens, and $N_{2n}$ is the index of refraction of the negative lens element of the cemented lens.

* * * * *